(12) United States Patent
Karpinski et al.

(10) Patent No.: US 11,296,370 B2
(45) Date of Patent: Apr. 5, 2022

(54) BATTERY HAVING HIGH THERMAL CONDUCTIVITY CASE

(71) Applicant: EAGLEPICHER TECHNOLOGIES, LLC, Joplin, MO (US)

(72) Inventors: Alexander Peter Karpinski, North Stonington, CT (US); Gregory J. Moore, Joplin, MO (US); Alben Puhlick, Joplin, MO (US)

(73) Assignee: EAGLEPICHER TECHNOLOGIES, LLC, Joplin, MO (US)

( * ) Notice: Subject to any disclaimer, the term of this patent is extended or adjusted under 35 U.S.C. 154(b) by 0 days.

(21) Appl. No.: 14/958,298

(22) Filed: Dec. 3, 2015

(65) Prior Publication Data
US 2017/0162920 A1    Jun. 8, 2017

(51) Int. Cl.
*H01M 10/653* (2014.01)
*H01M 2/02* (2006.01)
*H01M 50/116* (2021.01)

(52) U.S. Cl.
CPC ....... *H01M 10/653* (2015.04); *H01M 50/116* (2021.01); *H01M 2220/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,594,710 A | * | 4/1952 | Andre | H01M 50/411 429/136 |
| 3,558,358 A | * | 1/1971 | Ropp, Jr. | H01M 2/14 429/139 |
| 4,892,794 A | * | 1/1990 | Scholz | H01M 10/04 429/72 |
| 5,663,007 A | * | 9/1997 | Ikoma | H01M 2/0245 29/623.1 |
| 5,780,186 A | * | 7/1998 | Casey, Jr. | H01M 4/244 429/229 |
| 6,287,150 B1 | * | 9/2001 | Oda | H01M 2/105 174/50 |
| 2003/0019661 A1 | * | 1/2003 | Aoyama | H01B 1/026 174/126.1 |

(Continued)

FOREIGN PATENT DOCUMENTS

| | | | | |
|---|---|---|---|---|
| JP | 09-161737 | * | 6/1997 | H01M 2/02 |
| JP | 2003-331797 | * | 11/2003 | H01M 2/02 |

OTHER PUBLICATIONS

Maleki et al, "Thermal Properties of Lithium-Ion Battery and Components," J. Electrochem. Soc., 146 (3) 947-954 (1999) (month unknown).*

(Continued)

*Primary Examiner* — Amanda J Barrow
(74) *Attorney, Agent, or Firm* — Cantor Colburn LLP

(57) ABSTRACT

Some embodiments are directed to a battery. The battery can include a case having a hollow accommodation cavity formed therein. The case having a material that includes a blend comprising at least one of polysulfone, acrylonitrile butadiene styrene (ABS), Nylon, polyphenylene oxide (PPO), styrene-acrylonitrile (SAN), and polypropylene. The material of the case enables removal of thermal energy generated during operation of the battery.

12 Claims, 13 Drawing Sheets
(5 of 13 Drawing Sheet(s) Filed in Color)

(56) References Cited

U.S. PATENT DOCUMENTS

| | | | | |
|---|---|---|---|---|
| 2004/0142181 A1* | 7/2004 | Marsella | B05D 5/086 | 428/421 |
| 2004/0263119 A1* | 12/2004 | Meyer | H02J 7/00047 | 320/116 |
| 2004/0266951 A1* | 12/2004 | Akiyama | H01M 2/0257 | 525/191 |
| 2007/0037053 A1* | 2/2007 | Anantharaman | H01M 2/02 | 429/176 |
| 2010/0025132 A1* | 2/2010 | Hill | H01M 10/613 | 180/65.29 |
| 2010/0216004 A1* | 8/2010 | Yoon | H01M 50/24 | 429/99 |
| 2010/0304198 A1* | 12/2010 | Ahn | H01M 10/0459 | 429/94 |
| 2011/0090614 A1* | 4/2011 | Guerin | H01G 2/04 | 361/274.3 |
| 2011/0171497 A1* | 7/2011 | McGuire | H01R 33/945 | 429/7 |
| 2011/0177366 A1* | 7/2011 | Nagasaki | H01M 2/1022 | 429/83 |
| 2012/0177960 A1* | 7/2012 | Tasai | B60H 1/00278 | 429/72 |
| 2013/0071696 A1* | 3/2013 | Kim | H01M 2/0275 | 429/7 |
| 2013/0252048 A1* | 9/2013 | Teramoto | H01M 2/266 | 429/90 |
| 2013/0313754 A1* | 11/2013 | Heckenberger | H01M 2/0262 | 264/328.17 |
| 2013/0323573 A1* | 12/2013 | Tanaka | H01M 2/0242 | 429/154 |
| 2013/0344376 A1* | 12/2013 | Asaida | H01M 50/116 | 429/156 |
| 2014/0186693 A1* | 7/2014 | Tyler | H01M 2/0295 | 429/186 |
| 2014/0220391 A1* | 8/2014 | Fujii | H01M 2/1083 | 429/7 |
| 2014/0266222 A1* | 9/2014 | Baughman | H02J 7/00 | 324/426 |
| 2014/0378314 A1* | 12/2014 | Otto | H01L 39/248 | 505/230 |
| 2015/0030892 A1* | 1/2015 | Juds | H01M 2/1077 | 429/53 |
| 2015/0171398 A1* | 6/2015 | Roumi | H01M 10/4257 | 429/7 |

OTHER PUBLICATIONS

Taheri et al., "Transient three-dimensional thermal model for batteries with thin electrodes," J. Power Sources, 243 (2013) 280-289, Available online Jun. 11, 2013.*

Memorandum titled, "Clarification of Second Action Final Rejection Practice with Respect to Claims Drafted Using Alternative Language" dated Jan. 24, 2007 by John J. Love, Deputy Commissioner for Patent Examiner Policy (Year: 2007).*

* cited by examiner

| Part 302 | Material 304 | Mass Density 306 Lbf*s2/in/in3 | Thermal Conductivity 308 In*lbf/(s*in°F) | Specific Heat 310 In*lbf/(lbf*s2/in°F) |
|---|---|---|---|---|
| Cell Case 202 | Polysulfone | .00011646 | .0326376 | 1,034,179 |
| Cell Internals 312 | Electrodes, Separators, KOH | .00031076 | (perp.) .007050 (in plane) 1.05784 | 736,076 |
| Electrolyte 206 | KOH | .00013605 | .00154 | 2,201,000 |
| Silver Tabs 208 | Silver | .000982 | 52.33 | 201,500 |
| Solder 314 | 60%Sn/40%PB | .000748 | 6.384 | 154,483 |
| Terminals 204 | Brass | .000818 | 19.9 | 320,000 |
| Thermal Plastic 316 | PPS | .0001682 | 1.249 | 86,186 |
| Base Plate 318 | copper | .000836 | 50.0849 | 33,180 |

Fig. 3

| | Hours | Amps | Volts | Ah out | Internal Resistance Ohms | % DOD |
|---|---|---|---|---|---|---|
| PAU | 0.080 | 0.00 | 1.85 | 0.00 | | |
| PAU | 0.084 | 0.00 | 1.85 | 0.00 | | |
| DCH | 0.084 | 0.00 | 1.85 | 0.00 | | |
| DCH | 0.084 | -59.85 | 1.72 | 0.00 | | |
| DCH | 0.093 | -60.01 | 1.69 | -2.50 | | |
| DCH | 0.093 | -60.01 | 1.69 | -2.50 | | |
| DCH | 0.093 | -30.00 | 1.75 | -2.51 | -0.00220 | 0.6 |
| DCH | 0.093 | -30.00 | 1.76 | -2.52 | | |
| DCH | 0.095 | -30.02 | 1.76 | -2.58 | | |
| DCH | 0.345 | -60.00 | 1.50 | -17.58 | | |
| DCH | 2.045 | -60.01 | 1.50 | -119.59 | | |
| DCH | 2.045 | -60.00 | 1.50 | -119.59 | | |
| DCH | 2.046 | -30.01 | 1.53 | -119.59 | -0.00100 | 26.5 |
| DCH | 2.046 | -30.00 | 1.53 | -119.60 | | |
| DCH | 2.048 | -30.00 | 1.53 | -119.67 | | |
| DCH | 2.298 | -60.00 | 1.51 | -134.67 | -0.00100 | |
| DCH | 5.915 | -60.00 | 1.50 | -351.67 | | |
| DCH | 5.915 | -30.00 | 1.53 | -351.68 | -0.00097 | 77.9 |
| DCH | 5.915 | -30.00 | 1.53 | -351.69 | | |

| | | | Electrochemical Cell Heat Generation 100% Depth of Discharge | | | | | | |
|---|---|---|---|---|---|---|---|---|---|
| Step | Current (Amps) | Duration (Minutes) | Duration (Seconds) | Resistance (Ohms) | Power (Watts) | Power (lb-ft/sec) | Power (lb-in/sec) | Cell Internal Volume (in³) | Heat Generation per cell (lb-in/in³-sec) | Total Elapsed Time (sec) |
| 0 | 0 | 0 | 0 | 0.0022 | 0 | 0 | 0 | 0 | 0 | 0 |
| 1 | 60 | 0.1 | 6 | 0.0022 | 7.92 | 5.841492 | 70.0979 | 70 | 1.0014 | 6 |
| 2 | 60 | 59.9 | 3594 | 0.0022 | 7.92 | 5.841492 | 70.0979 | 70 | 1.0014 | 3600 |
| 3 | 60 | 60 | 3600 | 0.0022 | 7.92 | 5.841492 | 70.0979 | 70 | 1.0014 | 7200 |
| 4 | 60 | 60 | 3600 | 0.001 | 3.6 | 2.655224 | 31.86268 | 70 | 0.4552 | 10800 |
| 5 | 60 | 60 | 3600 | 0.001 | 3.6 | 2.655224 | 31.86268 | 70 | 0.4552 | 14400 |
| 6 | 60 | 60 | 3600 | 0.001 | 3.6 | 2.655224 | 31.86268 | 70 | 0.4552 | 18000 |
| 7 | 60 | 60 | 3600 | 0.001 | 3.6 | 2.655224 | 31.86268 | 70 | 0.4552 | 21600 |
| 8 | 60 | 60 | 3600 | 0.001 | 3.6 | 2.655224 | 31.86268 | 70 | 0.4552 | 25200 |

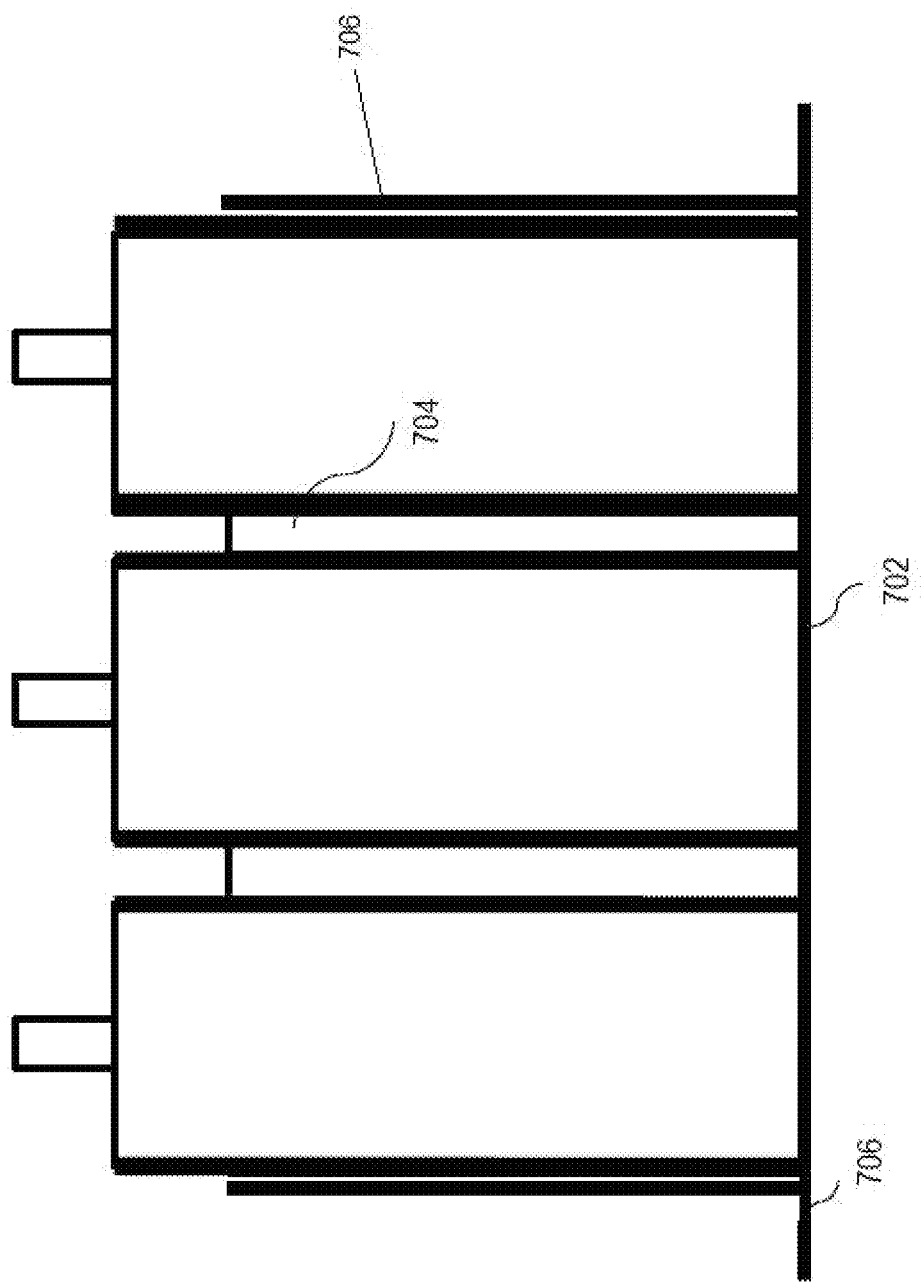

BATTERY HAVING HIGH THERMAL CONDUCTIVITY CASE

BACKGROUND

The disclosed subject matter relates to batteries. More particularly, the disclosed subject matter relates to composition of material of case of a battery, methods for removal of thermal energy generated by a battery, and methods for manufacturing case for a battery having high thermal conductivity.

A power source, such as a battery, is used to provide electrical voltage to a number of electrical devices. The battery converts chemical energy into electrical energy that is provided to the electrical devices used in various fields, such as, automobiles, space and satellites, industrial machineries, weapon systems, etc. The battery can be divided into two categories: a primary battery that is a non-rechargeable battery and a secondary battery that is a rechargeable battery. Various applications require the need of using the secondary batteries for their operations, such that when reactants within the battery are exhausted, energy is restored within the batteries. The secondary battery provides various advantages, such as low internal resistance, cost effective, etc.

SUMMARY

Use of rechargeable batteries have grown by leaps as global demand of upcoming technologies and their products such as laptops, mobile phones, computers, and other commonly known consumer electronic products has increased. In addition, interest in the rechargeable batteries used in the products has grown in order to support environmental issues such as, to conserve natural environment and resources and to curtail negative impacts of human activities.

One of the major concerns with the products is thermal energy that is heat generated by batteries of these electronic products. The charge capacity of batteries is reduced overtime when exposed to high temperatures such as above 120 degree Fahrenheit (° F.) for extended period.

In some related arts, batteries such as silver zinc cells are made out of injection molded thermoplastic cases by using materials such as polysulfone and acrylonitrile-butadiene-styrene. While, these materials feature outstanding stability in caustic electrolytes, they have poor thermal conductivity. Further, testing of these batteries during discharge shows high temperatures at the center of the batteries.

FIG. 1A represents a cross-sectional view of a battery 100A in some related arts. The battery 100A includes a polysulfone material case 102. As shown in FIG. 1A, heat generated by cells in the battery 100A is deposited near the center 104 of the battery 100A. During normal operation of the battery 100A, a silver zinc cell heats up during charge-discharge cycles and gets overheated beyond a temperature limit. Therefore, battery 100A of the related arts results in degradation of critical components of the battery 100A. This further leads to reduced cycle-life of the battery 100A.

In addition, in some related arts, the rise in temperature within the battery often occurs in the middle of the case 102 from where the removal of the generated thermal energy that is excess heat becomes difficult.

Some related arts, uses heat sinks within the batteries in order to remove the generated thermal energy. As shown in FIG. 1B, a battery 100B uses heat sinks 106 to remove the excess heat by transferring the heat from the battery 100B to a suitable heat sink 106. In some related arts, graphite is generally used as one of the materials in the battery 100B to transfer the excess heat from the battery 100B, as graphite has a thermal conductivity of 5.7 Watts per meter kelvin (W/mk). Material of the heat sink 106 based on graphite, have an in-plane thermal conductivity of over 1,700 W/mk, which can take the heat from between cells and the cell bottoms 102 to the heat sink 106. Therefore, heat sinks made up of graphite when placed between the cells prevent heat from propagating between the cells in the battery 100B.

Further, some related arts use electrically insulative plastic in the battery 100B having high thermal conductivity of 10 W/mk to remove the excess heat from the battery 100B. However, just by adding highly conductive material without a heat sink is not effective.

It may therefore be beneficial to provide a battery, and methods of use and manufacture thereof, that address at least one of the above issues. For example, in order to enhance thermal conductivity of a battery, a battery casing having high thermal conductivity can be configured and disposed within the battery.

It may therefore be beneficial to provide methods and apparatus that address at least one of the above and/or other disadvantages. In particular, it may be beneficial to produce a cooling architecture of the case of the battery in order to remove excess heat from the battery. The excess heat within the battery is generated by exothermic reaction accompanying discharging of the battery.

It may therefore be beneficial to provide methods and apparatus that address at least one of the above and/or other disadvantages. In particular, it may be beneficial to improve cycle-life of the battery to provide sufficient amount of electrical power to the electrical devices.

It may therefore be beneficial to provide methods and apparatus that address at least one of the above and/or other disadvantages. In particular, it may be beneficial to increase safety of the battery to prevent generation of thermal energy that can degrade the performance of the battery.

The configuration, size, shape, installation location and orientation, etc., of the battery can be varied depending on the type of application, etc., to provide electrical power.

Some other embodiments are directed to a battery. The battery can include a case having a hollow accommodation cavity formed therein. The case of the battery can include a plurality of components for generating a voltage, wherein the one or more components generate thermal energy during operation of the battery. The case of the battery has a material that includes a blend comprising at least one of polysulfone, acrylonitrile butadiene styrene (ABS), Nylon, polyphenylene oxide (PPO), styrene-acrylonitrile (SAN), and polypropylene. The material of the case enables removal of thermal energy generated during operation of the battery.

Yet other embodiments are directed to a method of producing a case for a battery. The method can include: preparing a mixture of materials, wherein the materials of the case includes at least one of polysulfone, acrylonitrile butadiene styrene (ABS), Nylon, polyphenylene oxide (PPO), styrene-acrylonitrile (SAN), and polypropylene; and blending the mixture of materials with thermally conductive polyphenylene sulphide. The blended mixture of the case enables removal of thermal energy generated during operation of the battery.

BRIEF DESCRIPTION OF THE DRAWINGS

The patent or application file contains at least one drawing executed in color. Copies of this patent or patent application publication with color drawings will be provided by the Office upon request and payment of the necessary fee.

The disclosed subject matter of the present application will now be described in more detail with reference to exemplary embodiments of the apparatus and method, given by way of example, and with reference to the accompanying drawings, in which:

FIG. 3 is a table illustrating properties of materials of the battery, in accordance with the disclosed subject matter.

FIG. 4 is a table illustrating internal resistance of the battery determined from a cell discharge test, in accordance with the disclosed subject matter.

FIG. 5 is a table illustrating heat generation calculation at 100% discharge of the battery, in accordance with the disclosed subject matter.

FIGS. 7A-7F illustrate finite element analysis and model results of the battery, according to various embodiments, in accordance with the disclosed subject matter.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Battery Structure

Figure 1A:
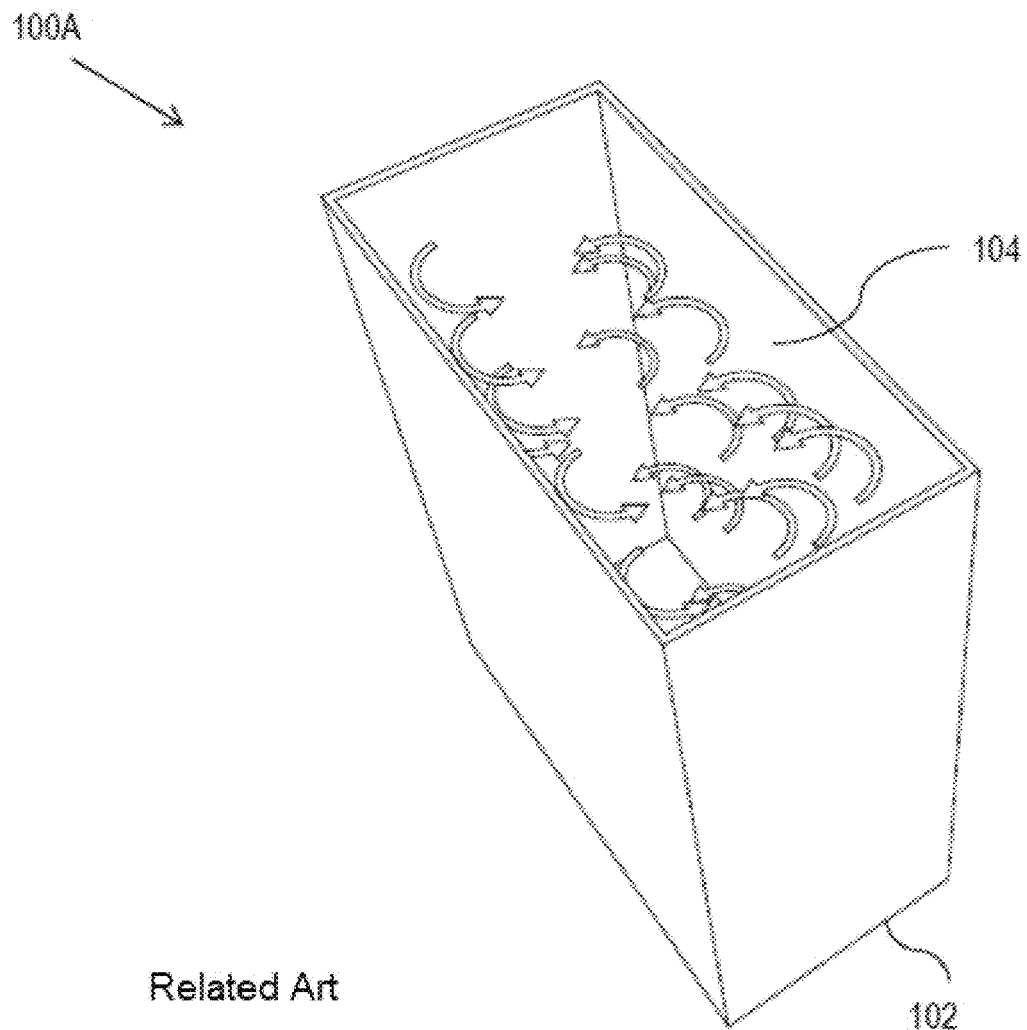
FIGS. 1A and 1B illustrate related art battery case capable of removing excess heat from a battery in accordance with the disclosed subject matter.
Figure 1B:
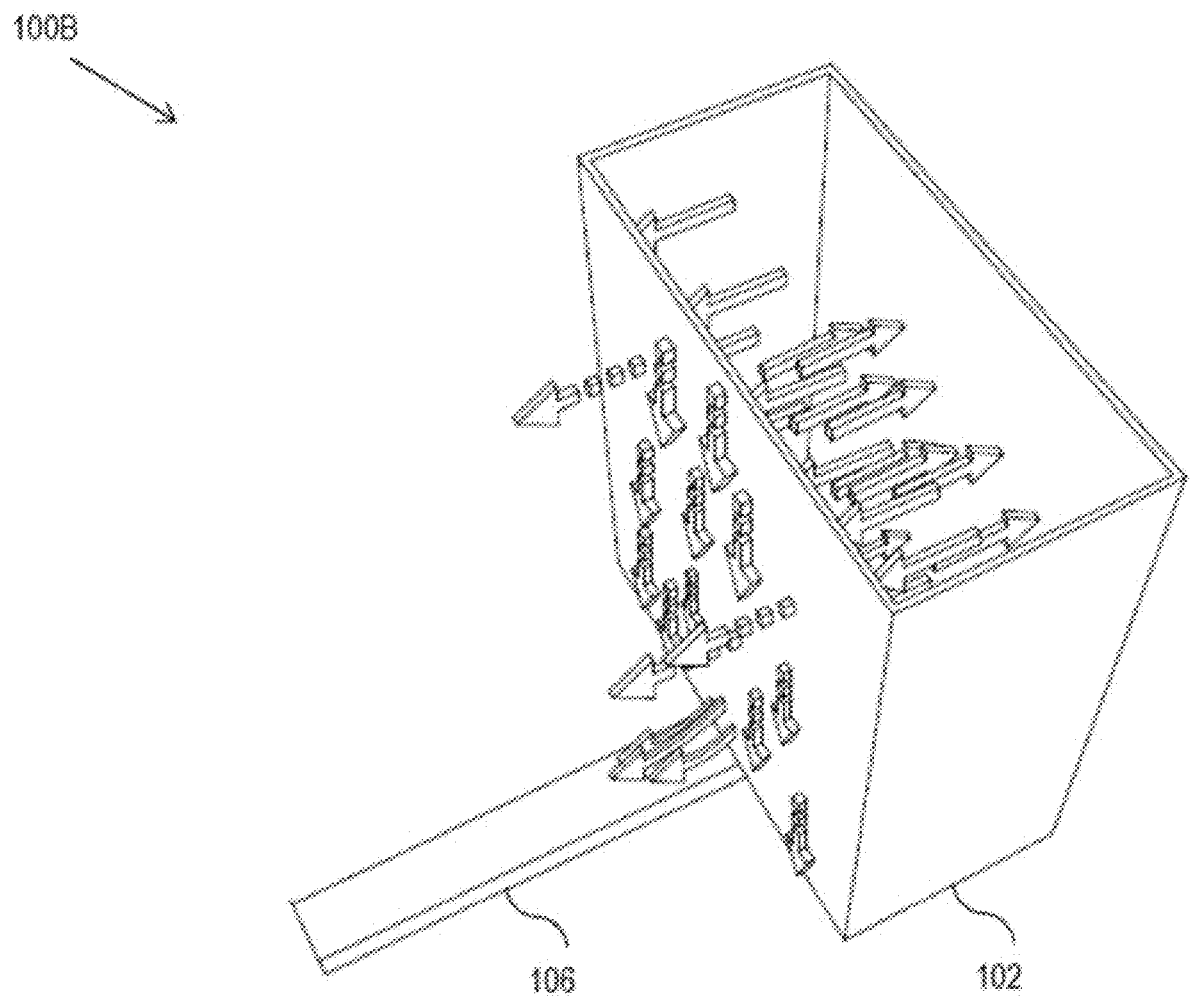
Figure 2:
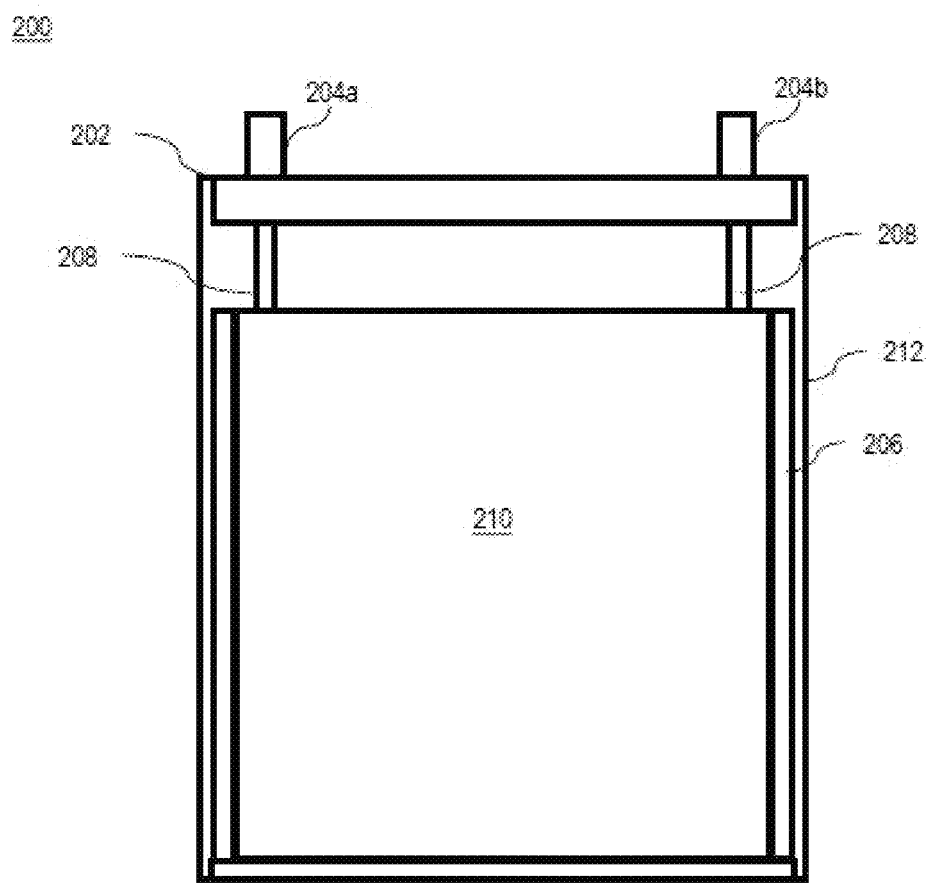
FIG. 2 is a model of a battery in accordance with the disclosed subject matter.

FIG. 2 is a model of a battery 200 that can include a cell case 202, terminals 204a-b, hereinafter referred to as terminal 204, electrode tabs 208, etc. in accordance with disclosed subject matter.

FIG. 2 illustrates the battery 200, and embodiments are intended to include or otherwise cover any type of battery, including, but not restricted to, silver zinc, Li ion, Pb Acid, Ni Cd, Ni MH, metal-air cells (e.g., using Mg, Zn, Al, Cd, and Li as the anodes), Ni Zn and Ni Fe. In fact, embodiments are intended to include or otherwise cover configurations of the battery to provide electrical power to electrical appliances, such as electric vehicles, hearing aids, forklifts, cameras, etc. In some embodiments, the battery 200 can be an electrochemical cell.

The battery 200 can include the cell case 202 of the battery 200. In some embodiments, the cell case 202 is molded polysulfone. The properties of the molded polysulfone can make the cell case 202 tough and stable at high temperatures. Embodiments are intended to include or otherwise cover any shape or form of the cell case 202 with configurations that may be beneficial to provide stability at high temperatures. In accordance with some embodiments, the shape of the cell case 202 is generally rectangular having a length L, a width W, and a height H. However, the shape of the cell case 202 is shown as rectangular in FIG. 2 for illustration purposes only, and the various embodiments are intended to include or otherwise cover any shape of the cell case 202 that may be beneficial.

The battery 200 can include the terminal 204. In some embodiments, each of the terminals 204 of the battery 200 can include three layers. The three layers of the terminal 204 can include, but not restricted to, an inside layer of silver tabs, a middle layer of solder, and an outside layer of brass. Silver wires may alternatively be used in place of the silver tabs.

In certain embodiments, the terminals 204 of the battery 200 are modeled as squares. In alternate embodiments, the terminals 204 of the battery 200 are modeled as round. Embodiments are intended to include or otherwise cover any shape or form of the terminals 204 with configurations to provide electrical power to electrical products. In some embodiments, the terminals 204 of the battery 200 can be made up of copper, Ag plated steel, brass, tungsten, etc. Embodiments are intended to include or otherwise cover any material for terminals 204 with configurations that may be beneficial to transfer electrical voltage to electrical appliances.

The battery 200 can include electrode tabs 208. In some embodiments, the electrode tabs 208 can be positive tabs, and negative tabs. In alternate embodiments, the battery 200 can include a plurality of positive tabs, and a plurality of negative tabs. In some embodiments, the positive tabs of the plurality of electrode tabs 208 are grouped on one end of the battery 200 and terminate in a terminal. In certain embodiments, the hollow terminal can be a positive terminal. In some embodiments, the negative tabs of the plurality of electrode tabs 208 are grouped on another end of the battery 200 and terminate in a terminal. In certain embodiments, the terminal can be a negative terminal.

In some embodiments, the positive tabs can be made from a variety of materials, such as, but not limited to, silver, nickel and/or silver plated copper. In some embodiments, the negative tabs can be made from a variety of materials, such as but not limited to, silver, nickel and/or silver plated copper. In some embodiments, the battery 200 can use substrates such as thin silver sheets to form the negative tabs.

The battery 200 can include a plurality of separators. In some embodiments, the electrolyte 206 can be KOH, NaOH, and additives with the electrolytes such as ZnO and LiOH.

In some embodiments, the battery 200 can include one cell. In alternate embodiments, the battery 200 can include more than one cell.

The components of the battery 200, such as the cell pack 210, the electrolyte 206, the electrode tabs 208, etc., are disposed in the cell case 202. In some embodiments, the cell pack 210 can include a number of identical cells. In certain embodiments, the cells in the cell pack 210 can be connected in series. In alternate embodiments, the cells in the cell pack 210 can be connected in parallel. In accordance with some embodiments, the shape of the cell pack 210 is generally rectangular having a length l, a width w, and a height h. However, the shape of the cell pack 210 is shown as rectangular in FIG. 2 for illustration purposes only, and the various embodiments are intended to include or otherwise cover any shape of the cell pack 210 that may be beneficial to dispose a plurality of cells.

In some embodiments, the cell case 202 of the battery 200 can include a plurality of cell edges 212.

An exemplary battery, such as a silver-zinc cell, can include a cell case such as a plastic cell case. In some embodiments, the exemplary battery can include a plurality of positive electrodes, a plurality of separators, and a plurality of negative electrodes. In certain embodiments, the positive electrode, the negative electrode and the separator of the battery are disposed within the case of the battery. Each of the plurality of electrodes has a silver tab (or silver wire) welded to a top corner of the electrode. In addition, the positive tabs of the plurality of electrodes are grouped on one end of the battery and terminate in terminal. In an embodiment, the terminal can be a positive terminal. In some embodiments, the negative tabs of the plurality of electrodes are grouped on the other end of the battery and terminate in a terminal. In certain embodiment, the terminal can be a negative terminal. In some embodiments, the electrodes are filled with a solder anchoring the silver tabs (or wires). In some embodiments, the electrodes can be crimped or welded anchoring the silver tabs (or wires). The battery can further use substrates such as thin silver or copper sheets to form the negative electrodes of the battery.

In some embodiments, zinc substrates have zinc powder on both sides except for the end plates, which can normally have the zinc or zinc oxide on a side facing the silver sheet. In certain embodiments, the positive tabs have silver or silver oxide on both sides of exmet substrates (i.e. mesh reinforcement). In some embodiments, two positive plates are wrapped in cellophane with bottoms of the plurality of electrodes facing each other to form a first U-shaped wrap. In some embodiments, the structure of the case of the battery can be built with a negative half plate external to the first U-shaped wrap, a double sided negative inside a second folded U-wrap, a double sided negative plate between the first and second U-wraps, a double sided negative plate, etc. until the case is completed with another half negative. The multilayers of cellophane can create a very high thermal resistance perpendicular to the plane of the electrodes.

II. Methods for Manufacturing the Battery Case

In some embodiments, the case 202 of the battery 200 can be made by using an injection molding process. The injection molding process can be used to produce the case 202 of the battery 200 by injecting a material into a mold. In accordance with some embodiments, the shape of the mold is generally rectangular having a length x, a width y, and a height z. However, the various embodiments are intended to include or otherwise cover any shape of the mold that may be beneficial to include or otherwise dispose components of the battery 200.

In certain embodiments, the material of the case 202 can be, but not limited to, thermoplastic material. The thermoplastic material can include, but not restricted to, polysulfone. In some embodiments, the material of the case 202 can be thermally conductive blended with a second material. In certain embodiments, the second material can be a Polyphenylene Sulfide (PPS).

In some embodiments, the Polyphenylene Sulfide (PPS) can be thermally conductive blended with the materials such as polysulfone in order to produce the case 202 of the battery 200. In some embodiments, the percentage of the PPS blended with the materials such as polysulfone can be 40. In alternate embodiments, the percentage of the PPS blended with the materials can be 60. In certain embodiments, the percentage of the PPS blended with the materials such as polysulfone can be in the range of 10 to 100, and preferably 40 to 60.

A method for producing the case 202 of the battery 200 is disclosed, in accordance with disclosed subject matter. In some embodiments, a mixture of the materials is prepared. As discussed above, the materials can include, but not restricted to, polysulfone.

Further, the prepared mixture can be blended with the thermally conductive material such as Polyphenylene Sulfide (PPS). In some embodiments, the mixture can be blended by using injection-molding process.

The prepared mixture can then be poured into a mold to produce the case 202 of the battery 200.

In accordance with some embodiments, the shape of the cell case 202 is generally rectangular having a length L, a width W, and a height H. In alternate embodiments, the shape of the cell case 202 of the battery can be, but not limited to, square, sphere, cube, etc. However, the shape of the cell case 202 of the battery 200 is rectangular shown in FIG. 2 for illustration purposes only, and the various embodiments are intended to include or otherwise cover any shape of the cell case 202 of the battery 200 that may be beneficial to accommodate a plurality of cells within the battery 200. For example, the shape of the cell case 202 may be prismatic.

Furthermore, in some embodiments, the structure of the cell case 202 can include a plurality of partitions 704 (FIG. 7D). The plurality of partitions 704 may be used to divide the cell case 202 into a number of regions. In certain embodiments, the plurality of cells are disposed within the plurality of regions of the case 202 of the battery 200.

III. Properties of Materials

FIG. 3 is a table 300 illustrating properties of materials of the battery 200, in accordance with the disclosed subject matter. The table 300 can include a part 302 of the battery 200, material 304 of the part 302, mass density 306 of the material 304, thermal conductivity 308 of the material 304, and specific heat 310 of the material 304.

As shown in table 300, the cell case 202 can be made up of Polysulfone material having mass density 0.00011646 lbf*s2/in/in3, thermal conductivity of 0.0326376 in*lbf/(s*in ° F.) and specific heat of 1,034,179 in*lbf/(lbf*s2/in ° F.).

Similarly, internal components 312 of the battery 200 can be made up of a combination of materials such as electrodes, separators and electrolyte (KOH). The internal components 312 can have mass density 0.00011646 lbf*s2/in/in3, thermal conductivity of 0.0326376 in*lbf/(s*in ° F.) in a perpendicular plane and 1.05784 in*lbf/(s*in ° F.) in plane and specific heat of 736,076 in*lbf/(lbf*s2/in ° F.).

In some embodiments, the electrolyte 206 can be made up of free KOH having mass density 0.00013605 lbf*s2/in/in3, thermal conductivity of 0.00154 in*lbf/(s*in ° F.) and specific heat of 2,201,000 in*lbf/(lbf*s2/in ° F.). In an alternative embodiment, the electrolyte 206 can be made up of NaOH. Furthermore, some electrolytes may have additives such as ZnO or LiOH, for example.

The silver tabs 208 (or wires) of the battery 200 can be made up of silver having mass density 0.000982 lbf*s2/in/in3, thermal conductivity of 52.33 in*lbf/(s*in ° F.) and specific heat of 201,500 in*lbf/(lbf*s2/in ° F.).

Further, solder 314 of the battery 200 can be made up of materials, such as, but not restricted to tin (Sn) and lead (Pb). These materials can have mass density 0.000748, thermal conductivity of 6.384 in*lbf/(s*in ° F.) and specific heat of 154,483 in*lbf/(lbf*s2/in ° F.). In some embodiments, the percentage of tin in the solder 314 can be 60% and the percentage of lead in the solder 314 can be 40%.

The terminals 204 of the battery 200 can be made up of copper, Ag plated steel, brass, tungsten, etc. having mass density 0.000818 lbf*s2/in/in3, thermal conductivity of 19.9 in*lbf/(s*in °F.) and specific heat of 320,000 in*lbf/(lbf*s2/in °F.). In an embodiment, some terminals can be crimped or welded.

In addition, the thermal plastic 316 of the battery 200 can be made up of Polyphenylene Sulfide (PPS) material. The PPS can have mass density 0.0001682 lbf*s2/in/in3, thermal conductivity of 1.249 in*lbf/(s*in °F.) and specific heat of 86,186 in*lbf/(lbf*s2/in °F.).

In some embodiments, the thermal plastic 316 can be selected based on attributes, such as, but not restricted to, compatibility with electrolyte, conductivity of material, electrical resistivity of material, sealing cover to a case, modulus of elasticity (i.e. to restrain the battery 200 from swelling), compatibility with cleaning solvents, flexural strength, impact of strength, etc.

Further, a base plate 318 of the battery 200 can be made up of copper. The base plate 318 can have mass density 0.000836 lbf*s2/in/in3, thermal conductivity of 50.0849 in*lbf/(s*in °F.) and specific heat of 33,180 in*lbf/(lbf*s2/in °F.).

FIG. 4 is a table 400 illustrating an internal resistance R of the battery 200, in accordance with disclosed subject matter. The internal resistance R can be calculated by performing a thermal test on the battery 200 at different time intervals. In some embodiments, the thermal test of a battery can be a cell discharge test. Embodiments are intended to include or otherwise cover any type of thermal test that may be beneficial to calculate internal resistance R of the battery.

The internal resistance R of the battery 200 can be computed as a ratio of change in voltage (ΔV) and change in current (ΔI) in a time interval.

In some embodiments, the internal resistance R of the battery 200 can be computed in a pause (PAU) state of the battery 200. In alternate embodiments, the internal resistance R of the battery 200 can be computed in a discharge (DCH) state of the battery 200.

In an exemplary embodiment, an internal resistance R during discharging of the battery 200 at time 0.093 hour can be calculated. The internal resistance R during discharging of the battery 200 can be computed by dividing a change in voltage of the battery 200 from 1.69 volts to 1.75 volts with a change in current from 60.01 Amps to 30.00 Amps, and the internal resistance R is computed as 0.00220 Ohms.

Further, in some embodiments, a percentage of Depth of Discharge (DOD) of the battery 200 can also be computed. The Depth of Discharge (DOD) can indicate a State of Charge (SOC) of the battery 200. The DOD can determine a fraction of power that can be withdrawn from the battery 200. For example, if DOD of a battery is set at 40% by a manufacturer then only 40% of the energy of the battery can be used by load such as electrical appliances, etc. In the above exemplary scenario, the DOD of the battery 200 can be computed as 0.6%.

Similarly, during discharging state of the battery 200, at time 2.045 hour and 2.046 hour, the internal resistance R of the battery 200 can be computed. The internal resistance R of the battery 200 can be computed by dividing a change in voltage from 1.50 volts at 2.045 hour to 1.53 volts at 2.046 hour with a change in current from 60.00 Amps at 2.045 hour to 30.01 Amps at 2.046 hour. Then, the internal resistance R is computed as 0.00100 Ohms. At this time, the DOD of the battery 200 can be computed as 26.5%. In furtherance the internal resistance R can be calculated during other periods of the discharge where the internal resistance can be computed from the change of voltage and current as referenced at 5.915 hour. The internal resistance R is computed as 0.00097. At this time the DOD of the battery can be 77.9%.

It can be seen from the table 400 that as the time interval of the discharged battery state increases, the depth of discharge percentage also increases.

Further, the thermal energy generated by the battery 200 can be calculated by h=I^2 R, wherein; h is heat generated by the battery 200, I is the rate of discharge of the heat from the battery 200, and R is the internal resistance of the battery 200.

Therefore, as the rate of heat discharge from the battery is increased, the thermal energy generated by the battery also increased. Therefore, rate of removing the heat discharge from the battery needs to be increased in order to remove the excess heat from the battery 200.

FIG. 5 is a table 500 illustrating heat generated at 100% DOD of the battery 200 having the case 202, in accordance with disclosed subject matter. As shown in the table 500, at each step, parameters such as current (in Amps) and duration (in minutes and seconds) are monitored. In some embodiments, power of the battery 200, heat generation per cell, etc. can be computed based on the monitored parameters.

At step 0, time duration is zero minutes, current is zero Amps, and the resistance in the battery 200 can be computed as 0.0022 Ohms. The power can be computed as zero Watts and therefore, the heat generated per cell can be zero lb-in/in3-sec.

Similarly, at step 1, the current in the battery 200 is 60 Amps and time duration is 0.1 minute and 6 seconds, the internal resistance of the battery 200 can be computed as 0.0022 Ohms. Based on the monitored parameters, the power of the battery 200 can be computed as 7.92 Watts and, therefore, heat generated per cell can be 1.0014 lb-in/in3-sec.

In some embodiments of the disclosed subject matter, total elapsed time can also be computed in seconds. In the table 500, the total elapsed time between the step 0 and the step 1 can be computed as 6 seconds.

Further, as time duration increases from 0.1 minute to 60 minutes at step 8, the internal resistance decreases to 0.001 Ohms and power generated is further reduced to 3.6 Watts, which is half of the heat generated at an initial time in the battery 200. Therefore, the heat generated per cell in the battery 200 is reduced to 0.4552 lb-in/in3-sec.

Figure 6:
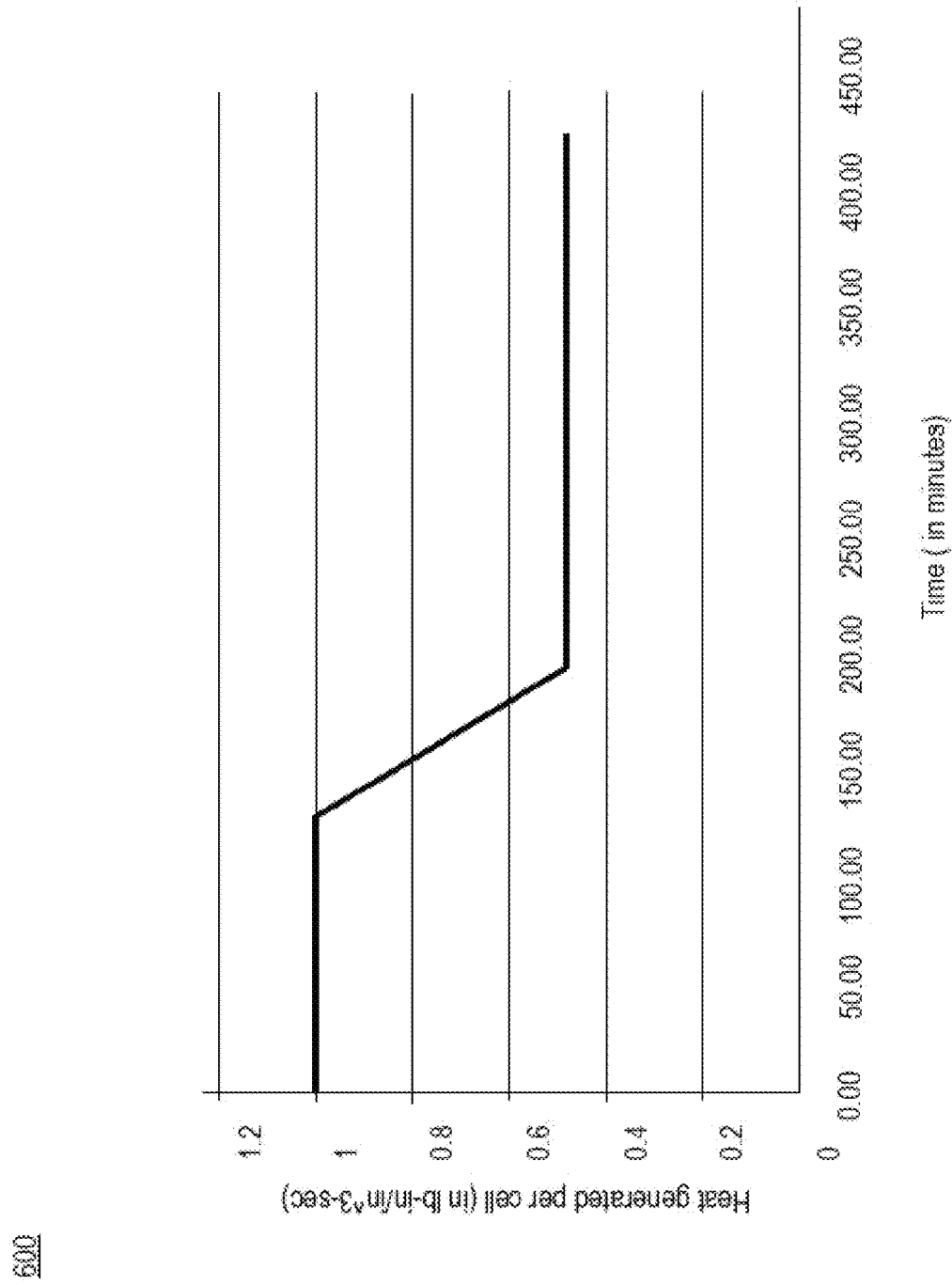
FIG. 6 is a graph illustrating heat generation at 100% discharge of the battery, in accordance with the disclosed subject matter.

FIG. 6 is a graph illustrating heat generation when the battery 200 is 100% discharged, in accordance with the disclosed subject matter.

In some embodiments, the heat generated by the battery 200 can be computed when current in the battery 200 is 60 Amps. The x-axis of the graph represents time in minutes and the y-axis of the graph represents the heat generated by the cells of the battery 200. As the time increases from zero minutes to 150 minutes, the heat generated per cell of the battery 200 is constant to 1 lb-in/in3-sec.

After 100 minutes, the heat generated per cell of the battery 200 can start decreasing with the increase in time. As can be seen from the table 600, the heat generated per cell in the battery 200 at time 200 minutes is decreased to approximately 0.4 lb-in/in3-secs.

Thereafter, the heat generated by the battery 200 can remain constant as the time increases after 200 minutes. This shows that the addition of the polyphenylene sulfide (PPS) into the mixture of the cell case 202 of the battery 200 can increase the thermal conductivity of the battery 200, which further removes excess heat from the case 202 of the battery 200.

IV. Analysis Results

FIGS. 7A-7F illustrate finite element analysis results of the battery 200, in accordance with disclosed subject matter. In some embodiments, the analysis for three-cells in a battery 200 in adiabatic environment (i.e. poor thermal conductivity) is shown.

Figure 7A:
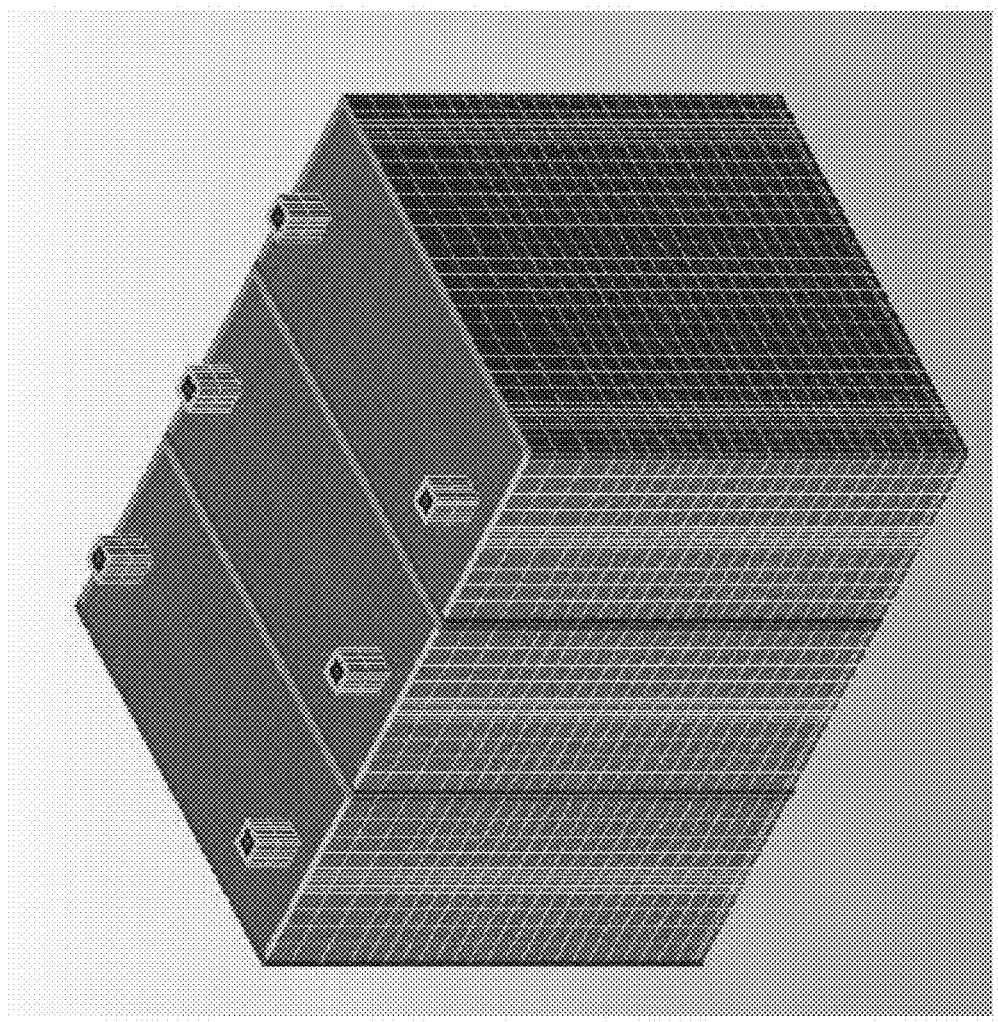

FIG. 7A illustrates FEA analysis result of the battery cases of the related arts such as 100A or 100B in the adiabatic environment. The heat generated by the batteries as 100A or 100B is deposited near the center (e.g., cell cover 201) of the battery 200. This can further result in an increase in temperature at the center of the cell case of the batteries 100A and 100B. The temperature near the center of the battery 100A and 100B can be increased to approximately 139° F.

Figure 7B:
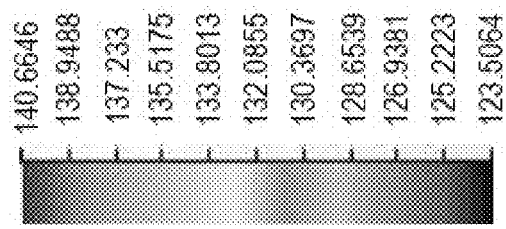
Figure 7B:
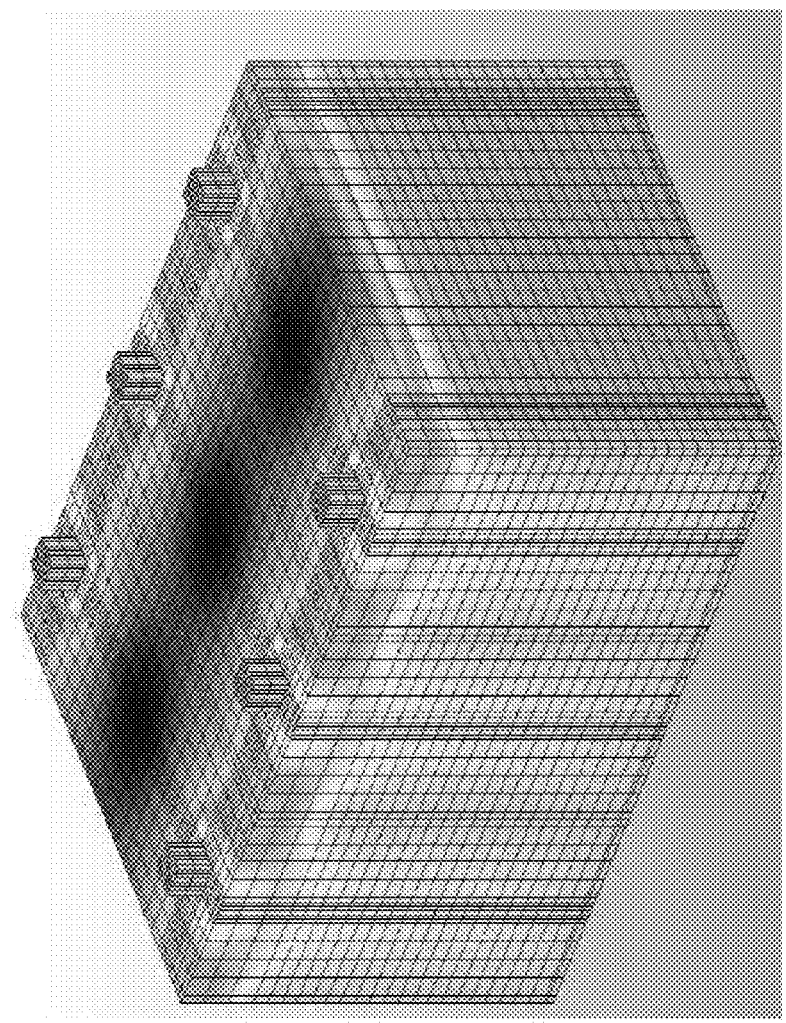

FIG. 7B illustrates full model result of the three-cell FEA analysis, in accordance with disclosed subject matter. The results of the analysis can illustrate that excess heat from the cell case 202 of the battery 200 can be removed, which further reduces the temperature of the battery 200.

In some embodiments, the temperature of the cell cover 201 can be reduced to a range of 123° F. to 128° F. while the temperature at the cell edges 212 can be reduced to a range of 133° F. to 137° F. For example, referring to the table 500, at step 7 and time duration 24000 sec, the maximum temperature of the case 202 of the battery 200 can be 140.665° F. and the minimum temperature of the case 202 of the battery 200 can be 123.506° F. Therefore, the heat generated by the battery 200 is less than 1 lb-in/in$^3$-sec.

Figure 7C:
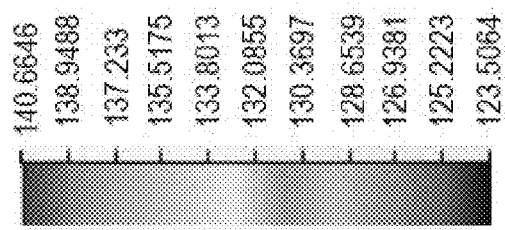
Figure 7C:
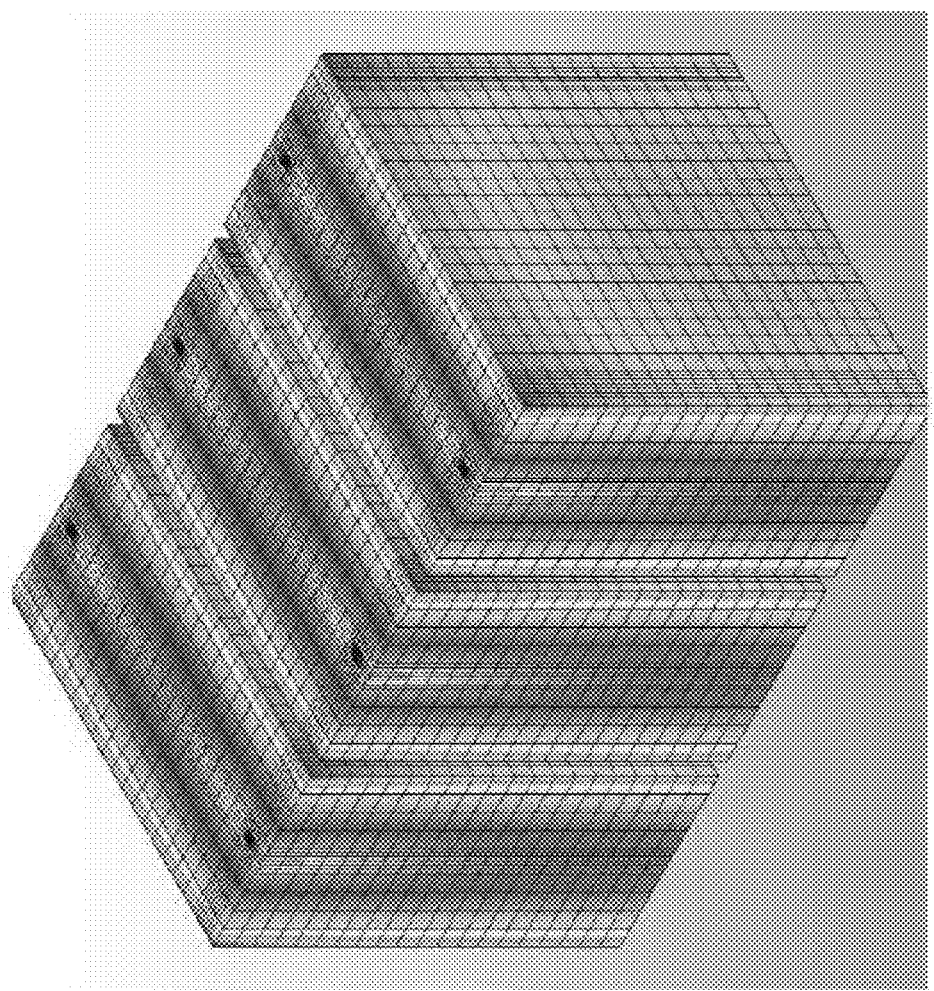

FIG. 7C illustrates three-cell FEA analysis of the battery 200 without the case 202 of the battery 200, in accordance with disclosed subject matter. Each of the cells in the battery 200 can dissipate heat near the center of the case 202 of the battery 200. Therefore, the maximum temperature near the center of the battery 200 at time 24000 sec can be as high as 140.665° F., while the minimum temperature near the center of the battery 200 at time 24000 sec can be as low as 136.969° F.

Therefore, by using the case 202 made up of PPS can reduce the temperature near the center of the case 202 of the battery 200 by approximately 8° F.

FIG. 7D illustrates a heat transfer model of the battery 200, in accordance with disclosed subject matter. In order to transfer heat from the case 202 of the battery 200, a heat transfer model can be used. In some embodiments, the heat generated by the battery 200 can be transferred to a heat sink such as the heat sink 106. In alternate embodiments, a thick conductive base plate 702 can be attached at the bottom of the battery 200. In some embodiments, the conductive base plate can be a copper base plate. In alternate embodiments, the conductive base plate can be any metallic plate that can be used to remove heat from the battery 200. In some embodiments, the thickness of the copper base plate 702 can be 0.125 inch. Embodiments are intended to include or otherwise cover any configuration of the copper base plate 702 to provide excess heat removal from the battery 200. In fact, embodiments are intended to include or otherwise cover any configuration of the conductive plates that may be beneficial to provide excess heat removal from the battery 200.

In some embodiments, a thermal conductive plastic partition 704 can be added between the cells of the battery 200. In certain embodiments, the thickness of the thermal conductive plastic partition 704 can be 0.250 inch. Embodiments are intended to include or otherwise cover any configuration of the thermal conductive plastic partition 704 to provide excess heat removal from the battery 200. In fact, embodiments are intended to include or otherwise cover any configuration of the thermal conductive plastic partition 704 that may be beneficial to provide excess heat removal from the battery 200.

Further, at the end faces of the case of the battery 200, a thick thermal conductive plastic 706 can also be added. In some embodiments, the thickness of the thick thermal conductive plastic 706 can be 0.125 inch. Embodiments are intended to include or otherwise cover any configuration of the thick thermal conductive plastic 706 to provide excess heat removal from the battery 200. In fact, embodiments are intended to include or otherwise cover any configuration of the thermal conductive plastic that may be beneficial to provide excess heat removal from the battery 200

The addition of the copper base plate 702, the thermal conductive plastic 704 and the thermal conductive plastic 706 can be used to remove excess heat from the battery 200 and therefore to increase thermal conductivity of the battery 200.

Figure 7E:
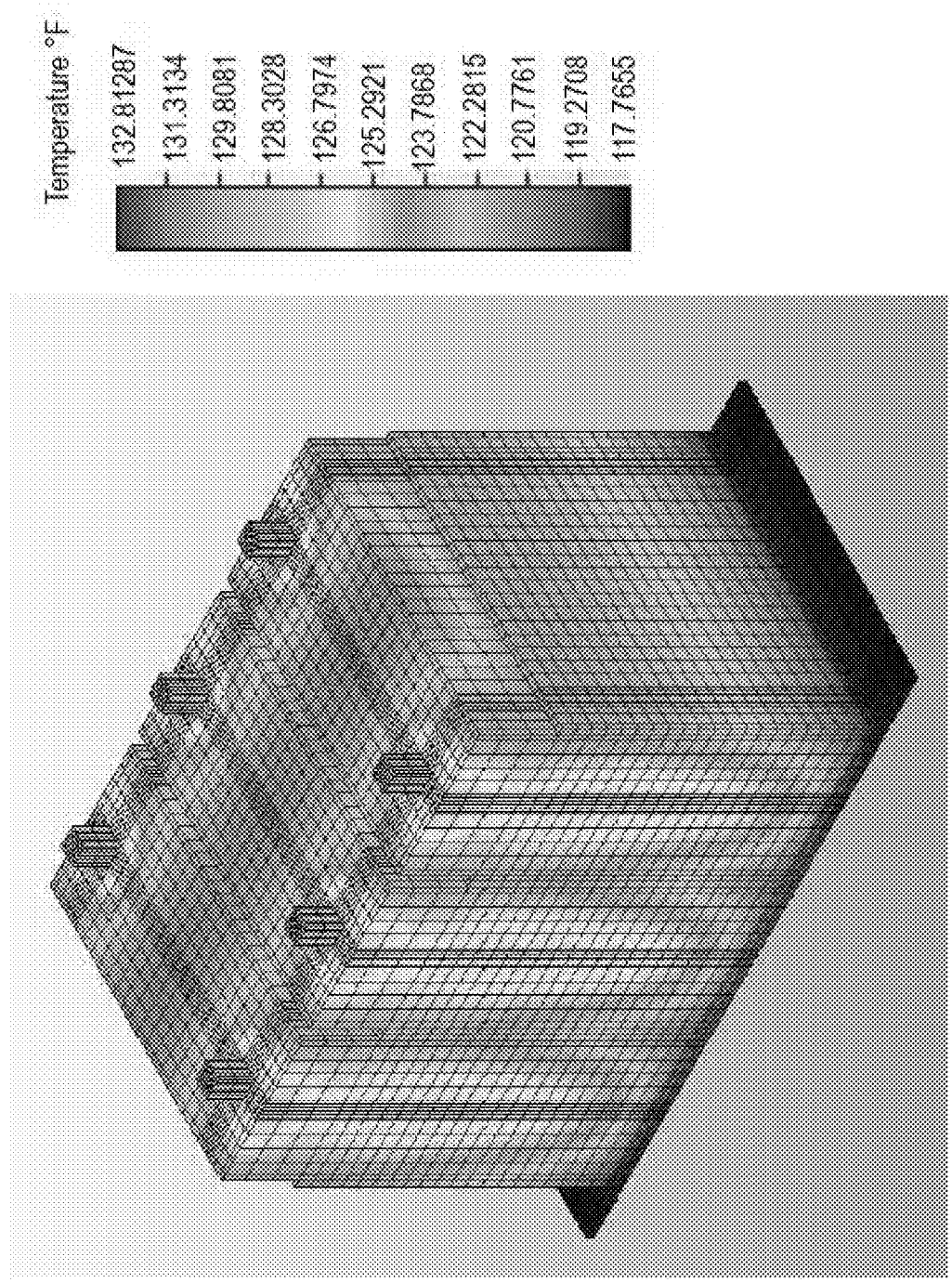

FIG. 7E illustrates a result of the heat transfer model of the battery 200 shown in FIG. 7D, in accordance with disclosed subject matter. The analysis shows a tremendous reduction in the temperature of the battery 200. At time 24000 sec, the maximum temperature of the battery 200 is reduced to 132.8187° F., while the minimum temperature is also reduced to 114.808° F. Therefore, the temperature of the battery 200 may be reduced to approximately 8° F. that is less than the adiabatic condition that shows that the heat is transferred from the batteries 100A and 100B to the heat sink 106.

Figure 7F:
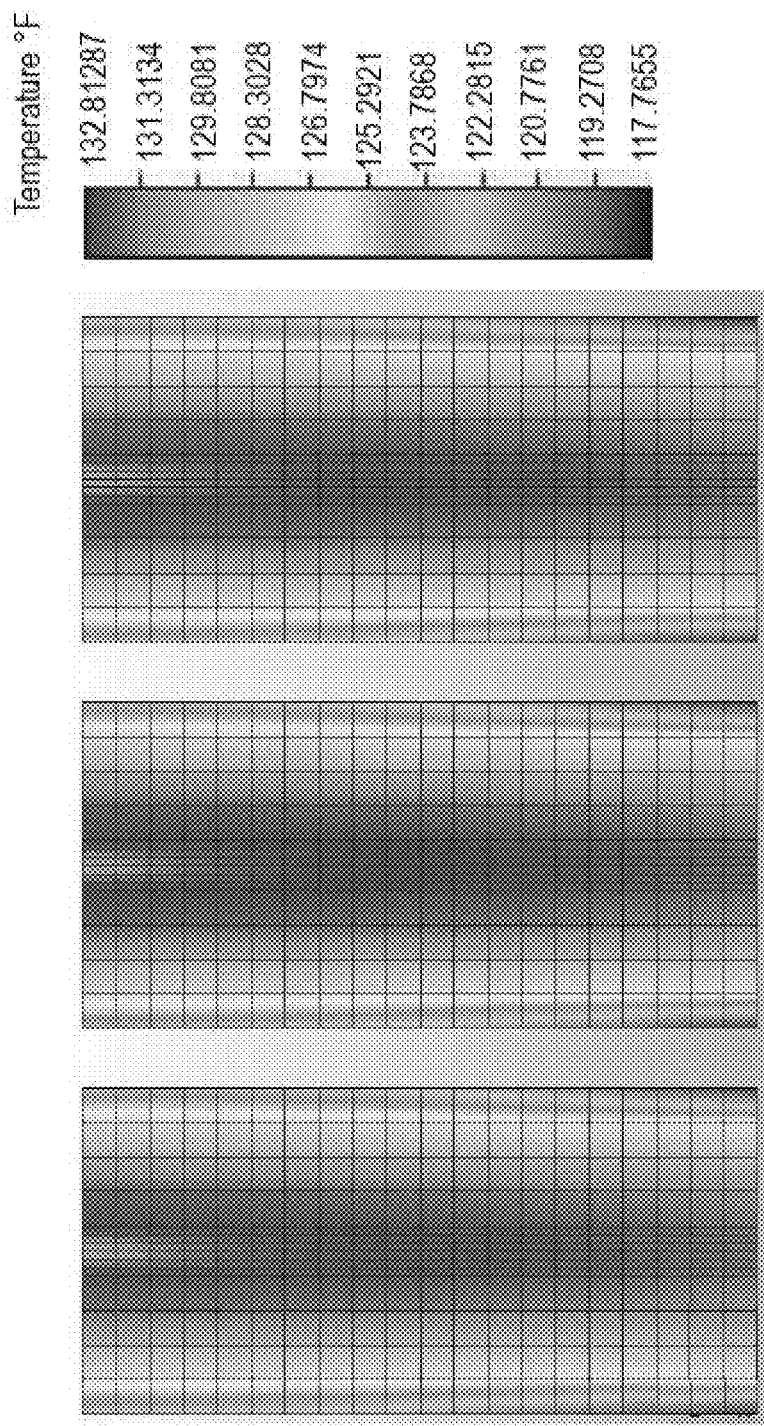

FIG. 7F illustrates a cross sectional view of the three-cells in the battery 200, in accordance with disclosed subject matter. The FEA analysis shows that the maximum temperature near the center of the battery 200 is now reduced to 132.8187.degree. F. and the minimum temperature at the cell edges is reduced to 117.7655.degree. F. The reduction in the temperature of the battery 200 improves thermal conductivity and therefore, improves life of the battery 200.

V. Alternative Embodiments

While certain embodiments of the invention are described above, and FIGS. 2-7 disclose the best mode for practicing the various inventive aspects, it should be understood that the invention can be embodied and configured in many different ways without departing from the spirit and scope of the invention.

For example, embodiments are disclosed above in the context of three-cell battery. However, the disclosed cell case can be used in a battery having any number of cells to remove excess heat generated by the cells of the battery.

The case of the battery can dispose any number of cells and further removes excess heat generated by each of the cells. However, embodiments are intended to cover the battery and its case that can include different regions having different number of cells.

Exemplary embodiments are intended to include or otherwise cover any appropriate type of materials for manufacturing of a case of the battery disclosed above.

Embodiments are disclosed above in the context of improving thermal conductivity of a case of a battery. However, embodiments are intended to cover methods and apparatus for removing excess heat generated by the cells of the battery.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A battery comprising:
   a case having a hollow accommodation cavity formed therein, wherein the case has a material that includes a mixture of polyphenylene sulfide and polysulfone (PSU), wherein the material is thermally conductive and enables removal of thermal energy generated during operation of the battery;
   thermally conductive plastic layers disposed on outer surfaces of end faces of the case;
   a plurality of silver-zinc cells disposed within the hollow accommodation cavity and including a plurality of positive electrodes, a plurality of negative electrodes, and a plurality of separators, wherein at least one positive electrode of the plurality of positive electrodes is wrapped in at least one layer of cellophane;
   a thermally conductive plastic partition disposed between adjacent silver-zinc cells of the plurality of silver-zinc cells and dividing the hollow accommodation cavity into at least two regions, wherein each of the plurality of silver-zinc cells is disposed within one of the at least two regions; and
   a thermally conductive base plate attached to the case and disposed in direct contact with a bottom of the case, wherein the thermally conductive base plate comprises copper and enables removal of the thermal energy from the case;
   wherein the thermally conductive plastic partition has a uniform thickness,
   wherein the thermally conductive plastic partition comprises polyphenylene sulfide,
   wherein the thermally conductive plastic partition is thermally coupled to the conductive base plate for removal of thermal energy from the thermally conductive plastic partition.

2. The battery of claim 1, wherein the case is formed by an injection molding process.

3. The battery of claim 1, wherein the battery further comprises at least two terminals that are modeled as squares.

4. The battery of claim 1, wherein the plurality of silver-zinc cells generate the thermal energy during the operation of the battery.

5. The battery of claim 1, comprising a plurality of thermally conductive plastic partitions that divide the case into a plurality of regions.

6. The battery of claim 5, wherein the plurality of silver-zinc cells are electrically connected to act as a single battery.

7. The battery of claim 1, wherein at least one positive electrode of the plurality of positive electrodes and at least one negative electrode of the plurality of negative electrodes are electrically connected to a load for providing a voltage generated by the battery.

8. The battery of claim 7, wherein the at least one positive electrode is connected to a positive terminal and the at least one negative electrode is connected to a negative terminal.

9. The battery of claim 7, wherein the at least one negative electrode is disposed within the hollow accommodation cavity.

10. The battery of claim 1, wherein the thermally conductive plastic partition has a thickness of 0.250 inch.

11. The battery of claim 1, wherein the silver-zinc cells each further comprise an electrolyte comprising KOH, NaOH, LiOH, ZnO, or a combination thereof.

12. The battery of claim 1, wherein the plurality of positive electrodes comprises silver electrodes, and wherein the plurality of negative electrodes comprises zinc electrodes.

* * * * *